(12) United States Patent
Aoki

(10) Patent No.: US 8,836,159 B2
(45) Date of Patent: Sep. 16, 2014

(54) COMPOUND-TYPE WIND POWER GENERATOR

(75) Inventor: Yoshio Aoki, Tokyo (JP)

(73) Assignee: N-Tech Ltd., Tokyo (JP)

( * ) Notice: Subject to any disclaimer, the term of this patent is extended or adjusted under 35 U.S.C. 154(b) by 204 days.

(21) Appl. No.: 13/505,606

(22) PCT Filed: Dec. 16, 2009

(86) PCT No.: PCT/JP2009/070972
§ 371 (c)(1),
(2), (4) Date: May 2, 2012

(87) PCT Pub. No.: WO2011/058664
PCT Pub. Date: May 19, 2011

(65) Prior Publication Data
US 2012/0217757 A1 Aug. 30, 2012

(30) Foreign Application Priority Data

Nov. 10, 2009 (JP) ................................. 2009-257101

(51) Int. Cl.
*F03D 9/00* (2006.01)
*F03D 1/02* (2006.01)
*F03D 1/06* (2006.01)

(52) U.S. Cl.
CPC ............... *F03D 1/025* (2013.01); *Y02E 10/722* (2013.01); *F05B 2240/201* (2013.01); *Y02E 10/721* (2013.01); *Y02E 10/725* (2013.01); *F03D 1/0616* (2013.01); *F05B 2260/40311* (2013.01)
USPC ....................................................... 290/55

(58) Field of Classification Search
CPC ....... F03D 9/002; F03D 11/02; Y02E 10/725; Y02E 10/722
USPC .......... 290/44, 55; 415/2.1, 4.1, 4.2, 4.4, 4.5, 415/905, 906; 416/7, 132 B
See application file for complete search history.

(56) References Cited

U.S. PATENT DOCUMENTS 588,060 A * 8/1897 Fruit .............................. 416/143
4,366,386 A * 12/1982 Hanson ........................... 290/44
(Continued)

FOREIGN PATENT DOCUMENTS

| GB | 2006885 A | * | 5/1979 |
| JP | 2003129935 | | 5/2003 |

(Continued)

OTHER PUBLICATIONS

Search Report for International Patent Application No. PCT/JP2009/070972; Mar. 16, 2010.

(Continued)

*Primary Examiner* — Tulsidas C Patel
*Assistant Examiner* — Sean Gugger
(74) *Attorney, Agent, or Firm* — Barnes & Thornburg LLP

(57) ABSTRACT

A compound-type wind power generator capable of increasing the size of Magnus wind turbine by disposing a propeller wind turbine with the Magnus wind turbine and increasing the amount of electric power generation. The compound-type wind power generator includes a propeller wind turbine; a Magnus wind turbine with perpendicular center shafts and a bevel gear mechanism; generators driven by the horizontal rotation shaft of the Magnus wind turbine and the horizontal rotation shaft of the propeller wind turbine; and connection shafts for fixing the outer end of the perpendicular center shaft of each Magnus wind turbine to an adjacent propeller blade. The horizontal rotation shafts of the propeller wind turbine and of the Magnus wind turbine have a double shaft structure in which one of the horizontal rotation shafts is formed by a cylindrical portion and the other one is axially inserted through the cylindrical portion with a play therebetween.

6 Claims, 9 Drawing Sheets

(56) References Cited

U.S. PATENT DOCUMENTS

| | | | |
|---|---|---|---|
| 6,375,424 B1 * | 4/2002 | Scarpa | 416/4 |
| 2006/0251516 A1 * | 11/2006 | Sohn | 416/132 B |
| 2007/0046029 A1 * | 3/2007 | Murakami et al. | 290/55 |

FOREIGN PATENT DOCUMENTS

| JP | 2003129935 A * | 5/2003 |
|---|---|---|
| JP | 2007009822 | 1/2007 |
| JP | 2007085327 | 4/2007 |
| JP | 2007315182 | 12/2007 |
| JP | 2008057350 | 3/2008 |
| JP | 2008106619 | 5/2008 |

OTHER PUBLICATIONS

International Preliminary Report on Patentability and English Translation of the Written Opinion of the International Searching Authority, dated Jun. 12, 2012.

* cited by examiner

COMPOUND-TYPE WIND POWER GENERATOR

PRIORITY CLAIM

This patent application is a U.S. National Phase of International Patent Application No. PCT/JP2009/070972, filed 16 Dec. 2009, which claims priority to Japanese Patent Application No. 2009-257101, filed 10 Nov. 2009, the disclosures of which are incorporated herein by reference in their entirety.

BACKGROUND

1. Field

The disclosed embodiments relate to a compound-type wind power generator provided with a propeller wind turbine including a horizontal rotation shaft and a Magnus wind turbine including a perpendicular rotation shaft. It is herein to be noted that the term "perpendicular" is used with respect to the horizontal rotation shaft, and in other means, it may be called "vertical".

2. Related Art

In conventional technology, there have been proposed various wind power generators, and as the most popular one, there is known a propeller wind power generator provided with a propeller wind turbine including a horizontal rotation shaft (for example, see Patent Document 1).

Generally, in such a propeller wind power generator, the generated power amount is proportional to the square of the radius of the propeller wind turbine and the cube of the wind velocity. Accordingly, the radius of the propeller wind turbine is increased to improve the power generation efficiency and profitability.

The wind velocity is lower near the ground because of friction due to ground-shape or obstacles, but at high altitudes, the wind is strong, and accordingly, the wind can be captured efficiently. Thus, the height of a column supporting the propeller wind turbine is increased.

It is generally desirable that the propeller wind turbine is installed at a windy place where the wind condition is favorable at any time of the year. However, in Japan which is a small country and has complex topography, the installation sites are limited, thus being inconvenient. Furthermore, there is a fear that ecosystems of birds and the like may be negatively affected by bird-strike or the like.

In recent years, a Magnus wind power generator provided with a Magnus wind turbine has been proposed (for example, see Patent Document 2). In a Magnus wind power generator, a plurality of rotation cylinders which rotate around perpendicular center shafts upon receipt of wind are radially arranged on a horizontal rotation shaft, and the rotation of the rotation cylinders around the perpendicular center shafts is converted into the horizontal rotation and transmitted to the horizontal rotation shaft by a transmitting mechanism, so that a generator is driven by the horizontal rotation shaft.

The Magnus wind turbine is generally small, and accordingly, the rotation cylinders can be rotated by relatively light wind.

PRIOR ART DOCUMENTS

Patent Document 1: Japanese Patent. Laid-Open No. 2007-9822 and Patent Document 2: Japanese Patent Laid-Open No. 2007-85327

SUMMARY

However, in the Magnus wind power generator disclosed in the Patent Document 2, inner ends of the plurality of rotation cylinders arranged radially on the horizontal rotation shaft are cantilevered, and outer ends are not supported, but constitute free ends. Accordingly, it is difficult to increase the perpendicular axial length of the rotation cylinders to increase their size.

Since the ends of the plurality of rotation cylinders are cantilevered, a problem of being bent, which may be increased by the lifting power of the rotation cylinders. Therefore, the rotation cylinders may be damaged due to their own bending. Furthermore, the transmitting mechanism for converting the perpendicular rotational force of the rotation cylinders into the horizontal rotational force and transmitting the horizontal rotational force to the horizontal rotation shafts may be damaged by disengagement or locking of bevel gears or the like.

Disclosed embodiments provide a compound-type wind power generator capable of increasing the size of a Magnus wind turbine by providing a propeller wind turbine together with the Magnus wind turbine to thereby increase the amount of power generation.

A compound-type wind power generator according to at least one disclosed embodiment includes a propeller wind turbine including a plurality of propeller blades on a horizontal rotation shaft; a Magnus wind turbine including a plurality of cylindrical rotation members having helical protrusions on the outer surfaces thereof and rotating about perpendicular center shafts, the perpendicular center shafts rotatably supporting the cylindrical rotation members, respectively, and a transmitting mechanism for transmitting a rotational force of the cylindrical rotation members rotating about the perpendicular center shafts to a horizontal rotational shaft; generators respectively driven by the horizontal rotation shaft of the Magnus wind turbine and the horizontal rotation shaft of the propeller wind turbine; and a fixing unit for fixing an outer end of the perpendicular center shaft of each Magnus wind turbine to the adjacent propeller blade, in which the horizontal rotation shaft of the propeller wind turbine and the horizontal rotation shaft of the Magnus wind turbine are constituted by a double shaft structure in which one of the horizontal rotation shafts is formed by a cylindrical portion, and the other of the horizontal rotation shafts is axially inserted through the cylindrical member with a play therebetween.

According to disclosed embodiments, since the electric power is generated by both the generator of the propeller wind turbine and the generator of the Magnus wind turbine, the power generation efficiency of the compound-type wind power generator can be improved.

Furthermore, since the outer ends of the perpendicular center shafts rotatably supporting the cylindrical rotation members of the Magnus wind turbine are fixed to the adjacent propeller blades by the fixing unit, the lifting force generated in each cylindrical rotation member of the Magnus wind turbine can be given to the propeller blade as the rotational force via the fixing unit. Accordingly, the horizontal rotation shaft of the propeller wind turbine can be rotated by a force provided by combining the rotational force of the propeller blades and the lifting force of each rotation cylinder of the Magnus wind turbine. Thus, the efficiency of power generation by the propeller wind turbine can be improved.

Still furthermore, since the outer end of each perpendicular center shaft of each cylindrical rotation member of the Magnus wind turbine is fixed to the adjacent propeller blade by the fixing unit, the strength of the cylindrical rotation member in the axial direction can be increased. Accordingly, the axial length of the cylindrical rotation member can be increased, and thus, the power generation efficiency can be further increased.

Further, it may be that the cylindrical rotation members of the Magnus wind turbine are arranged at predetermined intervals in front of the propeller blades in a direction in which the propeller blades receive wind.

Furthermore, it may be that the cylindrical rotation members of the Magnus wind turbine are arranged to be overlapped with the propeller blades in the direction in which the propeller blades receive the wind.

Still furthermore, the cylindrical rotation members of the Magnus wind turbine may be arranged to be spaced apart from the propeller blades in a direction in which the propeller blades rotate.

Still furthermore, the compound-type wind power generator may further include a wheel-type wind turbine which concentrically surrounds outer ends of the cylindrical rotation members, which fixes the perpendicular center shafts of the cylindrical rotation members and which is fixed to the outer ends of the propeller blades, the wheel-type wind turbine including a plurality of blades which are inclined so as to give a rotational force, acting in the same direction, to the propeller wind turbine.

Still furthermore, the compound-type wind power generator may further include: a body casing accommodating a boss securing the propeller blades, and bearings which support a horizontal rotation shaft connected to the boss, the transmitting mechanism and a horizontal rotation shaft of the Magnus wind turbine, the generators, and a bearing rotatably supporting the horizontal rotation shafts of the propeller wind turbine and the Magnus wind turbine; and a column rotatably supporting the body casing.

Still furthermore, the compound-type wind power generator may further include: an orientation control motor that rotates the body casing around the column; a wind direction detector that detects a direction of wind that the propeller wind turbine receives; and an orientation controller that sends to the orientation control motor an orientation control signal for rotating the body casing such that the propeller wind turbine face the wind direction detected by the wind direction detector.

DESCRIPTION OF THE DISCLOSED EMBODIMENTS

Figure 1:
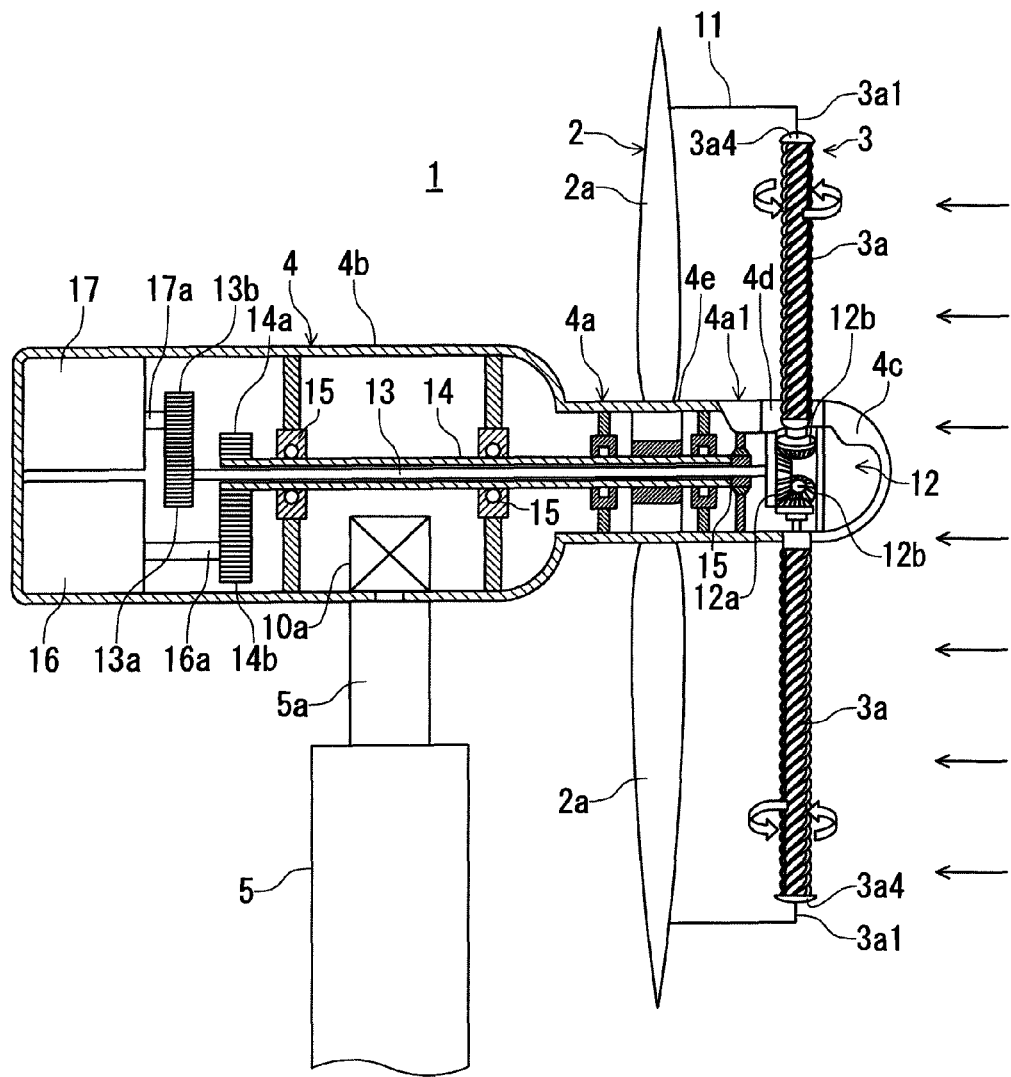
FIG. 1 is a schematic view showing a cross-section of a part of a compound-type wind power, generator according to a first embodiment.

Disclosed embodiments will be explained hereunder with reference to the accompanying drawings. It is further to be noted that the same or corresponding components are denoted by the same reference numerals in the drawings.

Figure 2:
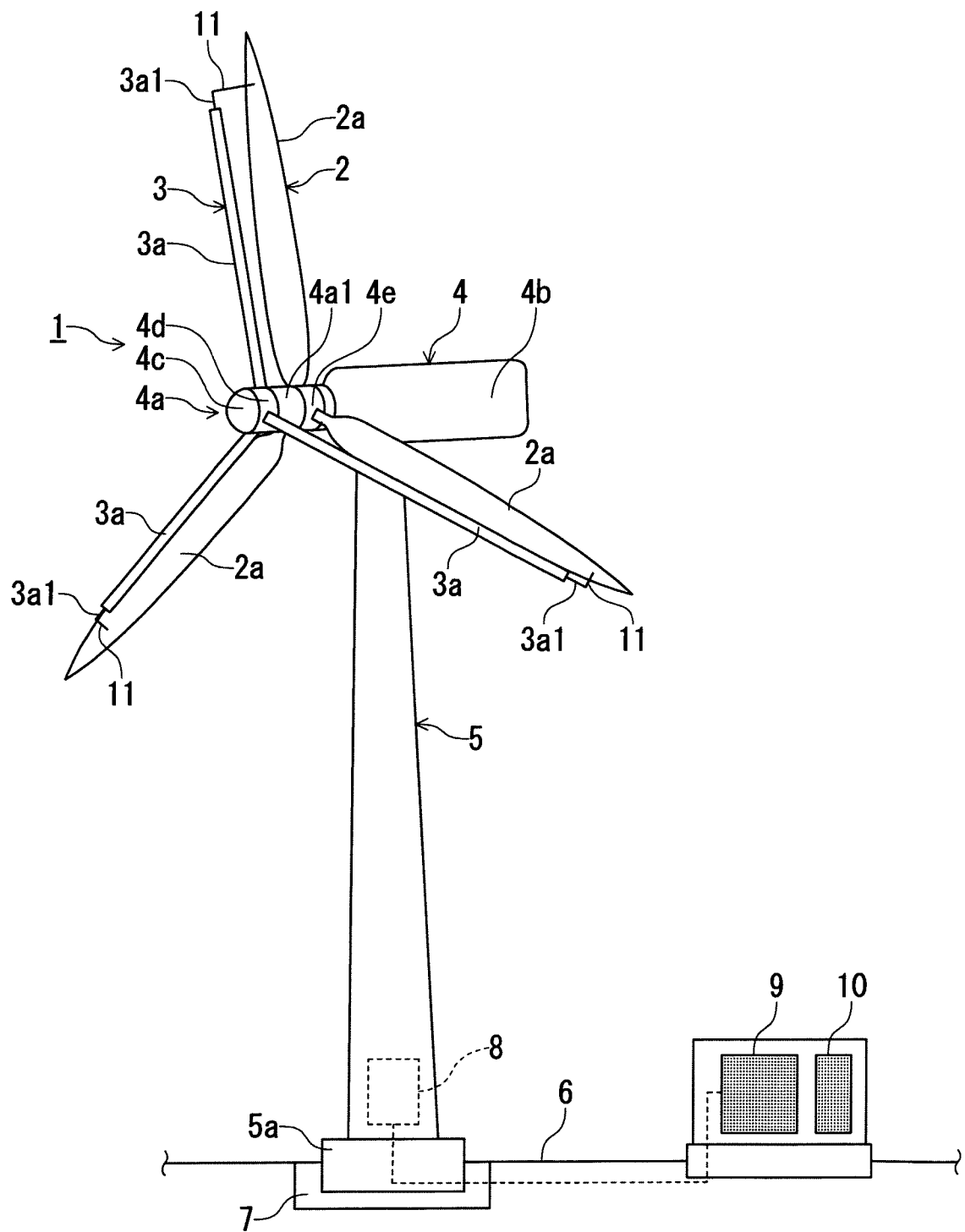
FIG. 2 is a perspective view showing the entire compound-type wind power generator shown in FIG. 1 according to the first embodiment.

As shown in FIG. 2, a compound-type wind power generator 1 according to the first embodiment includes a propeller wind turbine 2; a Magnus wind turbine 3 disposed in front of the propeller wind turbine 2, i.e., at the windward side thereof; a nacelle 4 as an example of a body casing for supporting the wind turbines 2 and 3; and a columnar pole 5 rotatably supporting the nacelle 4.

A fundamental structure (foundation structure or foundation) 5a embedded into the ground 6 is integrally provided at the lower end of the pole 5 as shown in FIG. 2. The fundamental structure 5a stands upright on a base 7 embedded in the ground. A transformer 8, a system interconnection protector 9, and an orientation controller 10 are arranged on the ground 6.

The system interconnection protector 9 applies the power, which is generated by the compound-type wind power generator 1 and is transformed by the transformer 8 to a predetermined voltage, to a power system, not shown.

The orientation controller 10 receives a wind-direction detection signal from a wind direction detector, not shown, for detecting a wind direction, and sends an orientation control signal to an orientation control motor 10a (see FIG. 1) for directing the nacelle 4, that is, the propeller wind turbine 2 and the Magnus wind turbine 3 to face in the wind blowing direction from which the wind blows. The orientation control motor 10a is comprised of, for example, a step motor, and is electrically connected to the orientation controller 10 by a wire, not shown, inserted through the pole 5.

In FIG. 2, the nacelle 4 includes a rotor 4a at the front portion thereof and a body 4b integrally formed at the back (rear side) of the rotor 4a. In the rotor 4a, a dome-like streamlined front fairing 4c is arranged at the front end of a cylindrical rotor body 4a1. At the back thereof, a cylindrical Magnus rotor 4d and a cylindrical propeller rotor 4e are arranged in this order to be rotatable around the center shafts of the rotors 4d and 4e. The rotors 4d and 4e are rotatably supported by bearings, not shown, arranged in the rotor body 4a1.

A plurality of, for example, three propeller blades 2a, 2a, 2a of the propeller wind turbine 2 are attached to the cylindrical outer circumferential surface of the propeller rotor 4e, spaced apart from each other at predetermined intervals, for example, 120 degrees in the circumferential direction. A plurality of, for example, three Magnus blades 3a, 3a, 3a of the Magnus wind turbine 3 are attached to the outer circumferential surface of the Magnus rotor 4d, spaced apart from each other at the same intervals as those of the propeller blades 2a, for example, 120 degrees in the circumferential direction, rotatably around perpendicular center shafts 3a1.

Figure 3:
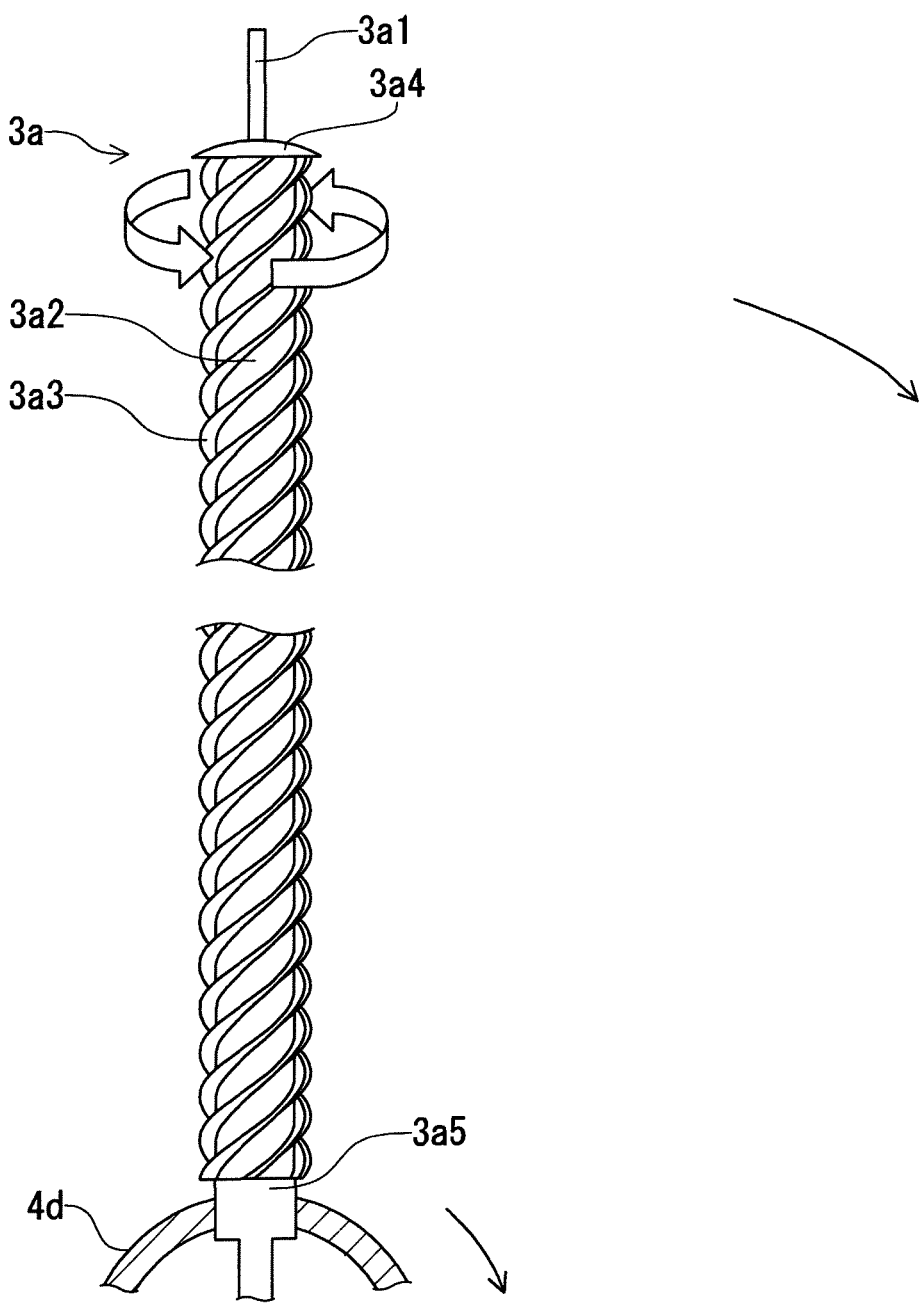
FIG. 3 is a front elevational view, partially cut away, showing a Magnus blade of the wind power generator shown in FIG. 1.

As shown in FIG. 3, each Magnus blade 3a includes a rotation cylinder 3a2, having a diameter larger than that of the perpendicular center shaft 3a1, arranged rotatably in a concentrical manner around the perpendicular center shaft 3a1. The rotation cylinder 3a2 is shorter than the propeller blade 2a in the axial direction. Narrow strip-shaped fins 3a3 are wound around and secured to the outer circumferential surface of the rotation cylinder 3a2 along the entire length in the axial direction, rotatably in the direction shown by white arrows in FIG. 3, for example, so as to form helical protrusions.

An end plate 3a4 is attached to the outer end (the upper end in FIG. 3) of the rotation cylinder 3a2. The perpendicular center shaft 3a1 rotatably penetrates through the end plate 3a4, projecting upward in FIG. 3. A cylindrical ferrule 3a5 is concentrically attached to the inner end (the lower end in FIG. 3) of the rotation cylinder 3a2. The ferrule 3a5 penetrates through the Magnus rotor 4d and is rotatable around the perpendicular center shaft 3a1.

Accordingly, when the Magnus blade 3a receives wind from the front side in FIG. 3, for example, the rotation cylinder 3a2 rotates around the perpendicular center shaft 3a1 in the direction shown by white arrows in FIG. 3 (counterclockwise direction). Thus, a pressure difference occurs around the Magnus blade 3a and a lifting force acting in the direction shown by a solid long arrow in the drawing is generated by the pressure difference. Accordingly, the Magnus rotor 4d rotates in the direction shown by a solid short arrow in FIG. 3.

Figure 4:
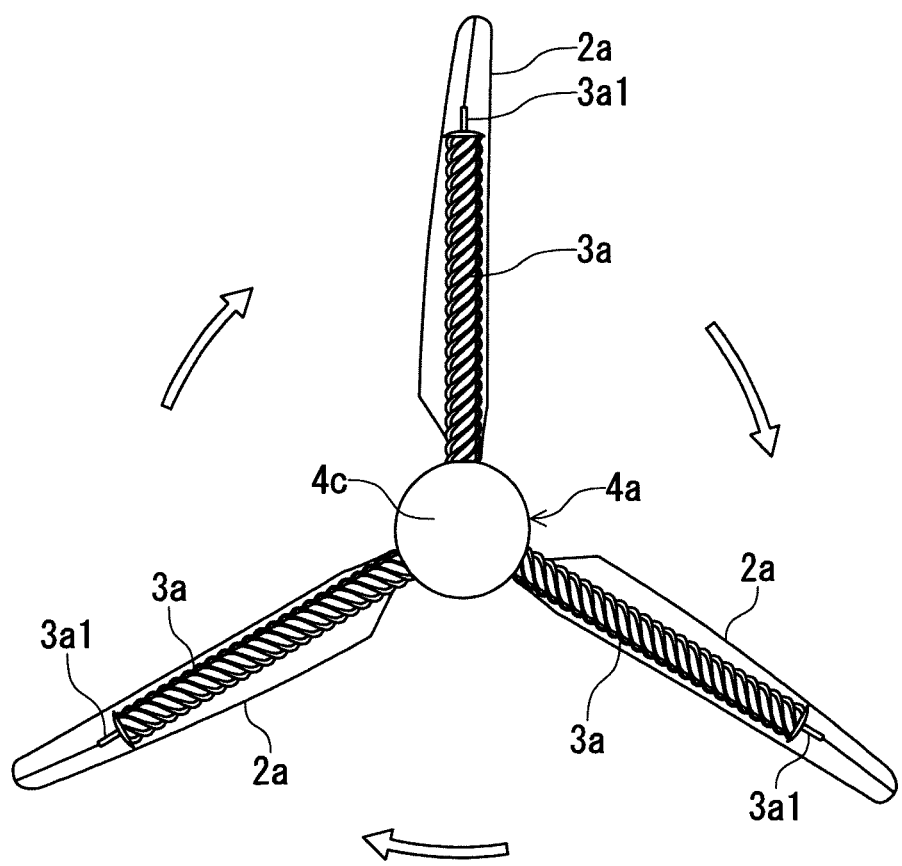
FIG. 4 is a front elevational view showing a positional relationship between the propeller wind turbine and the Magnus wind turbine shown in FIGS. 1 and 2 in an enlarged scale.

FIG. 4 is an elevation view mainly showing the positional relationship between the propeller blades 2a and the Magnus blades 3a. As shown in FIG. 4, the Magnus blades 3a are arranged in parallel with and substantially concentrically to the propeller blades 2a in front of the propeller blades 2a in the direction from which the wind blows. As shown in FIGS. 1 and 2, the propeller blades 2a are spaced from the Magnus blades 3a at a predetermined interval in the direction in which the wind blows (the horizontal direction in FIG. 1). A connection shaft 11, which is an example of a fixing unit, is attached to the outer end of the perpendicular center shaft 3a1 of each Magnus blade 3a and extends approximately orthogonal thereto.

As shown in FIGS. 1 and 2, the distal end of each connection shaft 11 is attached to the front side of the outer end of the adjacent propeller blade 2a in the horizontal direction in FIG. 2. Incidentally, the connection shaft 11 may be integrally formed by lengthening the perpendicular center shaft 3a1 and bending the perpendicular center shaft 3a1 to an approximately right angle.

Figure 5:
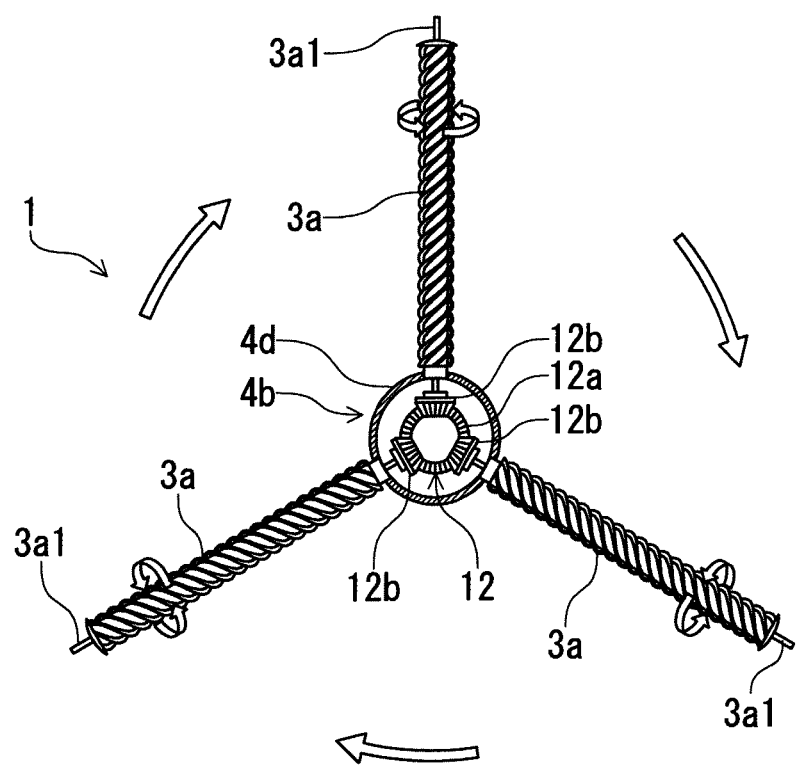
FIG. 5 is a front elevation view showing a cross-section of a transmitting mechanism of the Magnus wind turbine shown in FIGS. 1 and 2.

As shown in FIGS. 1 and 5, the rotor body 4a1 is arranged concentrically around a bevel gear mechanism 12, which serves as a transmitting mechanism for transmitting the perpendicular rotation of each Magnus blade 3a into a horizontal rotation, inside the Magnus rotor 4d. The bevel gear mechanism 12 includes a large bevel gear 12a on a driven side and small bevel gears 12b on a driving side, the small bevel gears 12b being orthogonally meshed with the bevel gear 12a and spaced apart from each other, for example, at 120 degrees in the circumferential direction. The inner ends of the ferrules 3a5 of the Magnus blades 3 are concentrically attached to the small bevel gears 12b.

As shown in FIG. 1, the large bevel gear 12a is concentrically attached to a Magnus shaft 13 serving as a horizontal rotation shaft. The Magnus shaft 13 is formed as an inner shaft of a double shaft, and is axially inserted with play through an axial portion of a propeller shaft 14 serving as a hollow horizontal rotation shaft having a larger diameter than that of the Magnus shaft 13.

A circular boss is concentrically attached to the outer circumference of the propeller shaft 14 at the right end portion in FIG. 1. The boss is attached to the inner surface of the propeller rotor 4e via a plurality of band plate-shaped arm members. The propeller shaft 14 and the Magnus shaft 13 are rotatably supported by a plurality of bearings 15, 15, . . . in the radial direction and the thrust direction at appropriate locations in the axial direction inside the rotor body 4b.

A circular drive gear 14a is concentrically attached to the outer circumference of the rear end (the left end in FIG. 1) of the propeller shaft 14, and an input shaft 16a of a propeller-side generator 16 is concentrically attached to a driven gear 14b meshed with the drive gear 14a.

The Magnus shaft 13 protrudes slightly toward the rear side (the left side in FIG. 1) from the rear end of the propeller shaft 14. The drive gear 13a is concentrically attached to the outer circumference of the protruding end of the Magnus shaft 13. The driven gear 13b meshed with the drive gear 13a is concentrically attached to an input shaft 17a of a Magnus-side generator 17. The electric output sides of the generators 16 and 17 are electrically connected to the transformer 8 (see FIG. 2) by means of a power line, not shown, disposed inside the pole 5. A speed-up or speed-down mechanism, not shown, may be provided at input shafts 16a and 17a of the generators 16 and 17.

The orientation control motor 10a receives electric power from at least one of the propeller-side and Magnus-side generators 16 and 17 or another power source, not shown. The rotational output shaft, not shown, of the orientation control motor 10a is attached to the projecting end of a fixed shaft 5a projecting into the body 4b and fixed in the body 4b at the center of gravity of the nacelle 4, so that the nacelle 4 can be rotated around the fixed shaft 5a.

Next, the behavior of the compound-type wind power generator 1 configured as described above will be explained hereunder.

The orientation controller 10 receives the wind-direction detection signal from the wind direction detector, not shown, and sends the orientation control signal to the orientation control motor 10a via a signal line, not shown, to rotate the nacelle 4 so that the propeller wind turbine 2 and the Magnus wind turbine 3 face the wind blowing direction.

The orientation control motor 10a rotates an output shaft thereof in accordance with the inputted orientation control signal. Since the orientation control motor 10a is fixed inside the nacelle 4, the nacelle 4 is rotated around the fixed shaft 5a of the pole 5 attached to the output shaft of the orientation control motor 10a so that the propeller wind turbine 2 and the Magnus wind turbine 3 can face in the wind blowing direction all the time.

As shown in FIG. 5, the Magnus blades 3a receive the wind and the rotation cylinders 3a2 rotate around the perpendicular rotation shafts 3a1 in the direction shown by the white arrows in FIG. 5, thereby generating the lifting force in the direction shown by the large white arrow lines. The Magnus rotor 4d rotates around its center (the Magnus shaft 13) due to the lifting force.

The perpendicular rotation of the rotation cylinder 3a2 of each Magnus blade 3a around the perpendicular rotation shaft 3a1 is converted into the horizontal rotation by the bevel gear mechanism 12 and transmitted to the horizontal rotation shaft 13. The rotational force of each Magnus blade 3a and the rotational force generated by the lifting force thereof are combined and transmitted to the horizontal rotation shaft 13.

The rotational force of the propeller wind turbine 2 is transmitted to the propeller shaft 14 serving as the horizontal rotation shaft. The propeller-side generator 16 is driven by the propeller shaft 14 to generate electric power, and the Magnus-side generator 17 is driven by the Magnus shaft 13 to generate electric power. The generated electric power is transmitted to the transformer 8 through wiring (not shown) inside the pole 5, transformed into a predetermined voltage, and transmitted to the power system after being subjected to a predetermined electric processing by the system interconnection protector 9.

Consequently, in the compound-type wind power generator 1 of the structure described above, since the electric power is generated by both of the propeller wind turbine 2 and the Magnus wind turbine 3, the amount of power generation can be increased as compared to a case where the electric power is generated by either one of these wind turbines. Thus, according to the present embodiment, the power generation efficiency can be improved.

Furthermore, since the propeller shaft 14 and the Magnus shaft 13 are formed in a double-shaft structure, the size and weight of the nacelle body 4b incorporated with these shafts can be kept low.

In addition, since the perpendicular center shafts 3a1 of the Magnus blades 3a are connected to the propeller blades 2a by the connection shafts 11 in the compound-type wind power generator 1, the lifting force of the Magnus blades 3a can be given to the propeller blades 2a. Accordingly, the rotational force of the propeller wind turbine 2 can be increased and the rotating speed per unit time can be also increased. Thus, the amount of power generation can be further increased.

Still furthermore, since the outer ends (distal ends) of the Magnus blades 3a are connected to the propeller blades 2a by the connection shafts 11 and are supported, the supporting strength of the Magnus blades 3a can be increased as compared to a case when the outer end of each Magnus blade 3a is not supported and formed as a free end. Consequently, the flexure or deformation can be suppressed.

Therefore, damage of the Magnus blades 3a, and disengagement or locking between the large bevel gear 12a and the small bevel gears 12b can be suppressed or prevented.

Still furthermore, since the outer ends of the Magnus blades 3a are supported by the propeller blades 2a via the connection shafts 11 and the supporting strength thereof is improved, each of the Magnus blades 3a can be lengthened and the size of the Magnus wind turbine 3 can be increased, thereby improving the power generation efficiency. In addition, since the outer ends of the Magnus blades 3a are connected to the propeller blades 2a by the connection shafts 11, the lifting force generated by the Magnus blades 3a can be transmitted to the propeller blades 2a. Thus, the number of rotations of the propeller wind turbine 2 can be increased.

Figure 6:
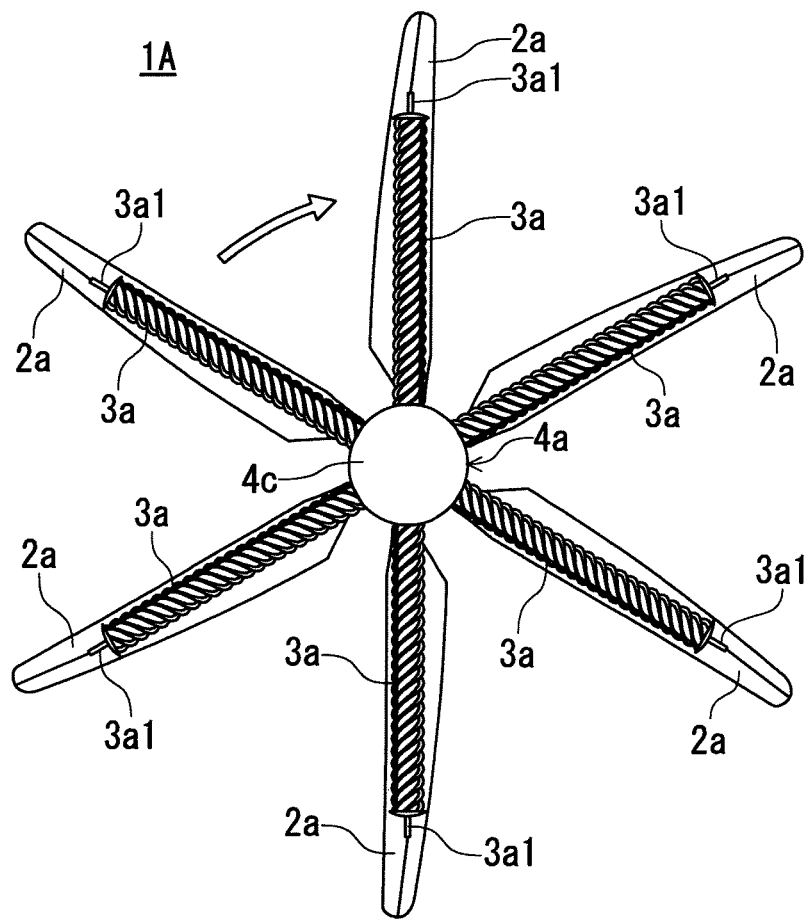
FIG. 6 is a front elevation view showing the main parts of a propeller wind turbine and a Magnus wind turbine in a compound-type wind power generator according to a second embodiment.

FIG. 6 is an elevation view showing a main part of a compound-type wind power generator 1A according to a second embodiment.

As shown in FIG. 6, the compound-type wind power generator 1A is provided with six propeller blades 2a and six Magnus blades 3a, while the compound-type wind power generator 1 of the first embodiment is provided with three propeller blades 2a and three Magnus blades 3a. Other structures of the compound-type wind power generator 1A are the same as those of the compound-type wind power generator 1.

In the compound-type wind power generator 1A, the increased number of blades increases the wind amount to be received by the propeller blades 2a and the Magnus blades 3a, and hence, the amount of power generation and the power generation efficiency can be improved. Incidentally, the number of the propeller blades 2a and the Magnus blades 3a may also be four, five, seven, or more.

Figure 7:
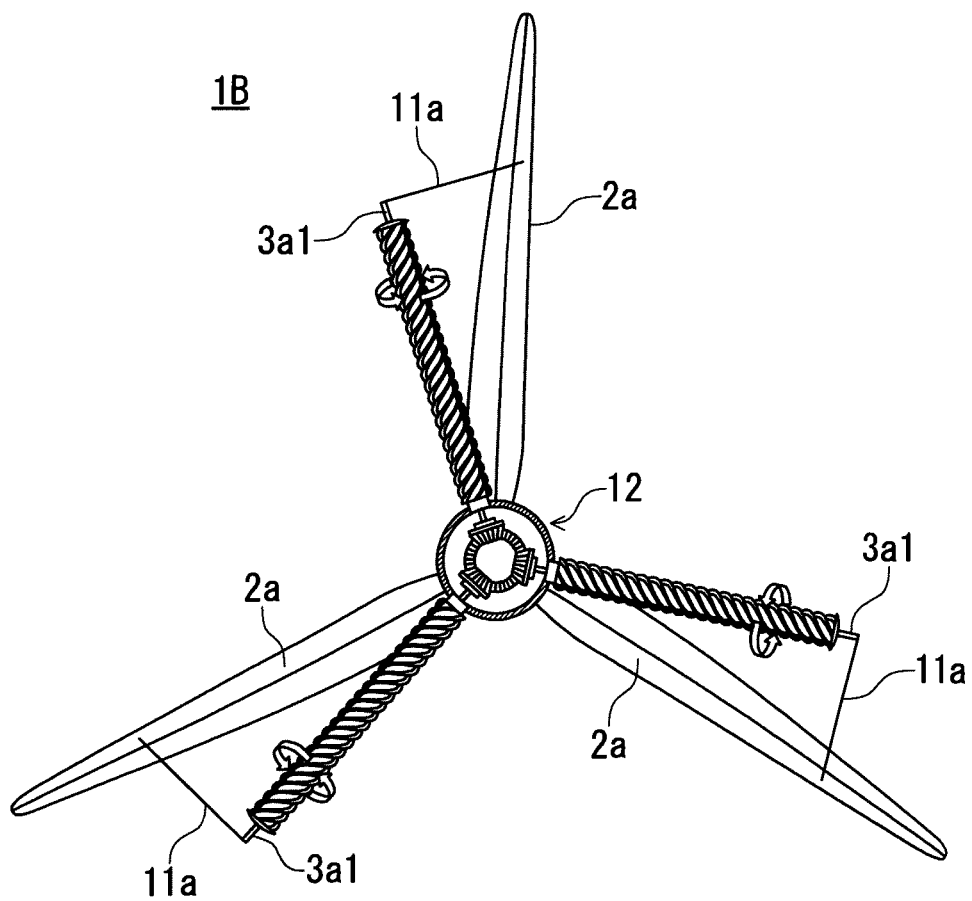
FIG. 7 is a front elevation view showing the main parts of a propeller wind turbine and a Magnus wind turbine in a compound-type wind power generator according to a third embodiment.

FIG. 7 is an elevation view showing a main part of a compound-type wind power generator 1B according to a third embodiment.

As shown in FIG. 7, in the compound-type wind power generator 1B, the Magnus blades 3a of the Magnus wind turbine 3 are not provided concentrically to the propeller blades 2a as viewed from the front side as in comparison with the compound-type wind power generator 1 of the first embodiment. That is, the Magnus blades 3a are provided such that their outer ends are spaced apart from the propeller blades 2a at a predetermined angle in the rotational direction, and the outer end of the perpendicular center shaft 3a1 of each Magnus blade 3a is fixed to the outer end of the adjacent propeller blade 2a by a connection shaft 11. Other structures of the compound-type wind power generator 1B are the same as those of the compound-type wind power generator 1.

In the present embodiment, since the Magnus blades 3a are spaced from the propeller blades 2a at a predetermined angle in the rotational direction, the length of the connection shafts 11a parallel to the rotational direction is increased as compared to the connection shafts 11 of the compound-type wind power generator 1.

In the compound-type wind power generator 1B according to the third embodiment, the propeller blades 2a are not affected by the Magnus blades 3a, and because the Magnus blades 3a are spaced apart from the propeller blades 2a in the rotational direction, the area of the propeller blades 2a which directly receives the wind is increased. Accordingly, the rotational speed of the propeller wind turbine 2 per unit time can be increased. Thus, the amount of power generation and the power generation efficiency of the propeller wind turbine-side generator 16 can be improved.

Figure 8:
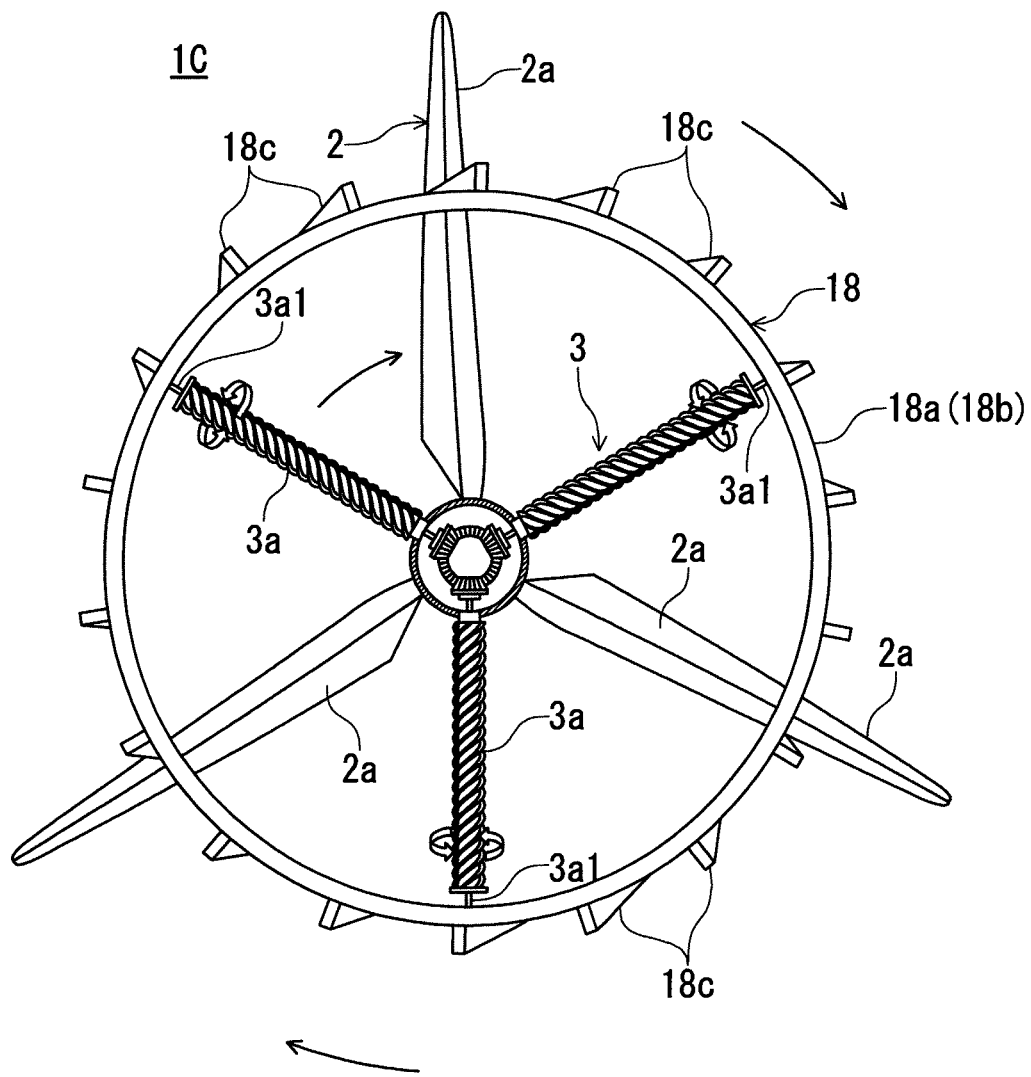
FIG. 8 is a front elevation view showing the main parts of a propeller wind turbine, a Magnus wind turbine, and a wheel-type wind turbine in a compound-type wind power generator according to a fourth embodiment.

FIG. 8 is an elevation view showing a main part of a compound-type wind power generator 1C according to a fourth embodiment.

As shown in FIG. 8, in the compound-type wind power generator 1C of the present embodiment, a wheel-type wind turbine 8 is provided instead of the connection shafts 11 and 11a provided in the compound-type wind power generators 1, 1A, and 1B of the former embodiments. In the compound-type wind power generator 1C, each Magnus blade 3a is provided at an intermediate portion between two adjacent propeller blades 2a, 2a, for example, at a position spaced apart from one propeller blade 2a at approximately 60 degrees of a center angle. The wheel-type wind turbine 18 is concentrically attached to the Magnus blades 3a and the propeller blades 2a.

Figure 9:
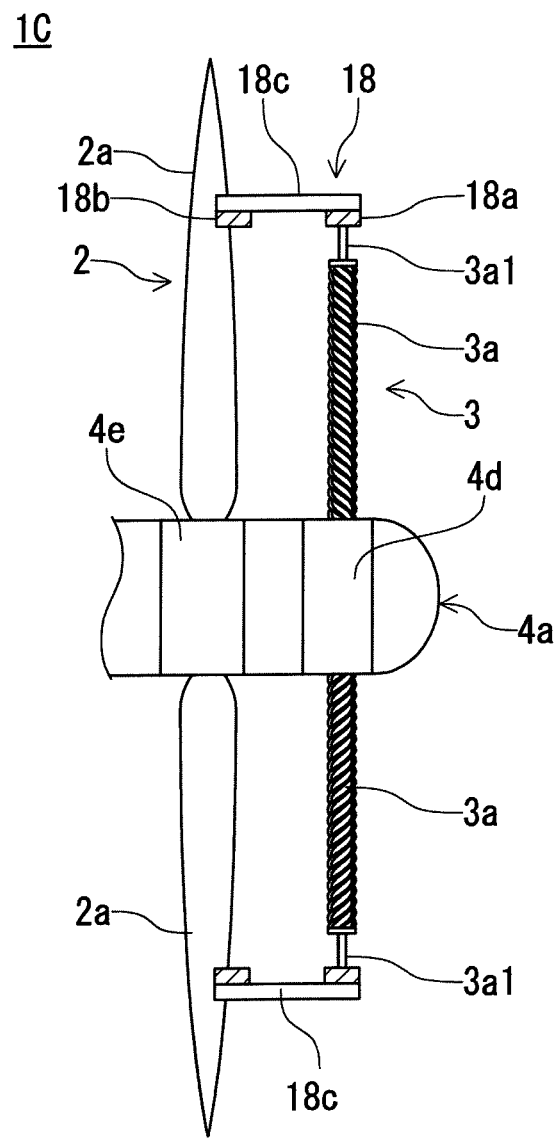
[FIG. 9] is a schematic view showing a cross-section of the main part of the wheel-type wind turbine shown in FIG. 8.

As shown in FIG. 9, the wheel-type wind turbine 18 includes: a front circular portion 18a having a circular front shape; a rear circular portion 18b having the same shape and size as the front circular portion 18a; and a plurality of blades 18c, 18c, ... bridged over the outer circumferential surfaces of the front and rear circular portions 18a and 18b in the outer circumferential direction (in the direction from the front side and the reverse side of the drawing paper in FIG. 8, and the horizontal direction in FIG. 9).

The front circular portion 18a is provided with a diameter larger than the diameter of the Magnus wind turbine 3, i.e., the sum of the length of the Magnus blade 3a and the perpendicular center shaft 3a1 thereof by an added predetermined length. The outer end portion of the perpendicular center shaft 3a1 of each Magnus blade 3a is secured to the inner circumferential surface of the front circular portion 18a in a supported manner.

As shown in FIG. 9, the rear circular portion 18b is concentrically arranged to the front circular portion 18a, and the rear surface of the rear circular portion 18b is attached to, a front side of the distal end (i.e., outer end) of the propeller blade 2a.

Each blade 18c is formed by, for example, a rectangular plate having a predetermined size, and as shown in FIG. 8, the blades 18c are spaced apart from each other with a predetermined interval in the circumferential direction of the front and rear circular portions 18a and 18b. Each blade 18c is inclined at a predetermined angle in the direction in which the front circular portion 18a faces the rear circular portion 18b, i.e., in the direction parallel to the axial direction of the wheel-type wind turbine 18. The inclined angle is adjusted so as to have an angle between the direction in which the propeller wind turbine 2 rotates as shown by the arrows in FIG. 8 and the direction in which the rotational force of the wheel-type wind turbine 18 is generated.

Accordingly, in the compound-type wind power generator 1C, the perpendicular center shaft 3a1 of each Magnus blade 3a is fixed by the circular wheel-type wind turbine 18 concentrically secured to the propeller blades 2a. Thus, the securing strength (supporting strength) of each perpendicular center shaft 3a1 can be increased.

Therefore, the length and size of the Magnus blade 3a can be increased, and the amount of power generation and the power generation efficiency can be improved.

Furthermore, since the rotational force generated by both of the wheel-type wind turbine 18 and the Magnus wind turbine 3 can be given to the propeller wind turbine 2, the rotational speed per unit time of the propeller wind turbine 2 can be increased. Thus, the amount of power generation and the power generation efficiency can be further improved.

In the wheel-type wind turbine 18, since the front and rear circular portions 18a and 18b are formed by circular frames and the plurality of blades 18c, 18c, . . . connecting the front and rear circular portions 18a and 18b in the front and back direction are formed by rectangular plates, the weight of the wheel-type wind turbine 18 can be reduced.

The invention claimed is:

1. A compound-type wind power generator, comprising:
a propeller wind turbine including a plurality of propeller blades mounted to a horizontal rotation shaft;
a Magnus wind turbine including a plurality of cylindrical rotation members having helical protrusions on their outer surfaces and rotating about perpendicular center shafts which rotatably support the cylindrical rotation members, respectively, and a transmitting mechanism for transmitting a rotational force of the cylindrical rotation members rotating about the perpendicular center shafts to a horizontal rotational shaft;
generators respectively driven by the horizontal rotation shaft of the Magnus wind turbine and the horizontal rotation shaft of the propeller wind turbine; and
a fixing unit for fixing an outer end of the perpendicular center shaft of each Magnus wind turbine to the adjacent propeller blade,
wherein the horizontal rotation shaft of the propeller wind turbine and the horizontal rotation shaft of the Magnus wind turbine are constituted by a double shaft structure in which one of the horizontal rotation shafts is formed by a cylindrical member and another one the horizontal rotation shafts is axially inserted through the cylindrical member with a play therebetween, and
wherein the cylindrical rotation members of the Magnus wind turbine are spaced apart from the propeller blades in a rotating direction of the propeller blades.

2. The compound-type wind power generator of claim 1, wherein the cylindrical rotation members of the Magnus wind turbine are arranged at a predetermined interval from each other in front of the propeller blades in a direction in which the propeller blades receive wind.

3. The compound-type wind power generator of claim 1, wherein the cylindrical rotation members of the. Magnus wind turbine are overlapped with the propeller blades in the direction in which the propeller blades receive the wind.

4. The compound-type wind power generator of claim 1, further comprising a wheel-type wind turbine which concentrically surrounds outer ends of the cylindrical rotation members, which fixes the perpendicular center shafts of the cylindrical rotation members and which is fixed to the outer ends of the propeller blades, the wheel-type wind turbine including a plurality of blades which are inclined to give a rotational force, acting in the same direction, to the propeller wind turbine.

5. The compound-type wind power generator of claim 1, further comprising a body casing accommodating a boss securing the propeller blades, and bearings which support a horizontal rotation shaft connected to the boss, the transmitting mechanism and a horizontal rotation shaft of the Magnus wind turbine, the generators, and a bearing rotatably supporting the horizontal rotation shafts of the propeller wind turbine and the Magnus wind turbine; and a column rotatably supporting the body casing.

6. The compound-type wind power generator of claim 5, further comprising:
an orientation control motor that rotates the body casing around the column;
a wind direction detector that detects a direction of wind to be received by the propeller wind turbine; and
an orientation controller that transmits to the orientation control motor an orientation control signal for rotating the body casing such that the propeller wind turbine faces the wind direction detected by the wind direction detector.

* * * * *